United States Patent
Deurloo et al.

(10) Patent No.: US 9,371,903 B2
(45) Date of Patent: Jun. 21, 2016

(54) METHOD FOR SHIFTING A SHIFT-BY-WIRE TRANSMISSION WITHOUT ENGINE POWER

(71) Applicant: FORD GLOBAL TECHNOLOGIES, LLC, Dearborn, MI (US)

(72) Inventors: Brian J. Deurloo, Howell, MI (US); Jeffrey James Tumavitch, Livonia, MI (US); Derek Kinch, Ypsilanti, MI (US); Richard Reynolds Hathaway, Livonia, MI (US); Todd Curtis Spaulding, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 14/265,395

(22) Filed: Apr. 30, 2014

(65) Prior Publication Data

US 2015/0316143 A1   Nov. 5, 2015

(51) Int. Cl.
| | |
|---|---|
| *B60W 10/18* | (2012.01) |
| *F16H 61/00* | (2006.01) |
| *F16H 63/34* | (2006.01) |
| *F16H 59/54* | (2006.01) |
| *F16H 63/48* | (2006.01) |

(52) U.S. Cl.
CPC ........ *F16H 61/0031* (2013.01); *F16H 63/3483* (2013.01); *F16H 59/54* (2013.01); *F16H 63/483* (2013.01); *F16H 2061/0034* (2013.01)

(58) Field of Classification Search
CPC ..... F16H 59/50; F16H 61/22; F16H 61/0031; F16H 61/30; F16H 63/3483; F16H 63/483; F16H 59/54; F16H 2061/0034
See application file for complete search history.

(56) References Cited

U.S. PATENT DOCUMENTS

| | | | |
|---|---|---|---|
| 4,843,901 A | 7/1989 | Peterson et al. | |
| 6,443,276 B2 | 9/2002 | Ahnert et al. | |
| 6,698,555 B2 * | 3/2004 | Schafer | B60T 1/005 188/170 |
| 7,861,839 B2 * | 1/2011 | Schweiher | F16H 63/3433 192/220.2 |
| 8,944,232 B2 * | 2/2015 | Schmidt | F15B 15/26 192/219.4 |
| 9,205,813 B2 * | 12/2015 | Yokota | B60T 1/005 |
| 2002/0084149 A1 * | 7/2002 | Heuver | B60T 1/005 188/69 |
| 2003/0019702 A1 * | 1/2003 | Goedecke | B60T 1/005 188/353 |
| 2006/0226285 A1 | 10/2006 | Matsui | |
| 2007/0235281 A1 | 10/2007 | Wang | |
| 2007/0284213 A1 * | 12/2007 | Duhaime | F16H 63/3483 192/222 |
| 2008/0173121 A1 | 7/2008 | Kimura et al. | |
| 2010/0101353 A1 | 4/2010 | Giefer et al. | |
| 2011/0034299 A1 * | 2/2011 | Nakamura | F16H 61/0031 477/167 |
| 2012/0160631 A1 * | 6/2012 | Bauer | F16H 63/3483 192/219.5 |
| 2013/0151092 A1 | 6/2013 | Spaulding et al. | |
| 2013/0151095 A1 | 6/2013 | Fyie et al. | |
| 2013/0151096 A1 | 6/2013 | Fyie et al. | |
| 2013/0319366 A1 * | 12/2013 | Karasawa | F01M 1/02 123/196 R |
| 2015/0041280 A1 * | 2/2015 | Schuller | F16H 63/483 192/219.4 |

FOREIGN PATENT DOCUMENTS

DE       4422257 C1     11/1995

OTHER PUBLICATIONS

Smirra, Karl, et al., Mechatronics for "Shift by Wire"—A Technical Challenge, SAE Technical Paper Series, 2007-01-1309, 2007 World Congress, Detroit, Michigan, Apr. 16-19, 2007, 8 pages.

* cited by examiner

*Primary Examiner* — David J Hlavka
(74) *Attorney, Agent, or Firm* — James Dottavio; Brooks Kushman P.C.

(57) ABSTRACT

A vehicle according to the present disclosure includes a shift-by-wire transmission, a pressure source configured to selectively provide hydraulic pressure in the absence of engine power, an internal combustion engine, and a controller. The shift-by-wire transmission includes a hydraulic actuator, and the electric pump is in fluid communication with the actuator. The controller is configured to, in response to a driver input and the engine being off, control the pressure source to provide hydraulic pressure to the hydraulic actuator.

13 Claims, 3 Drawing Sheets

METHOD FOR SHIFTING A SHIFT-BY-WIRE TRANSMISSION WITHOUT ENGINE POWER

TECHNICAL FIELD

The present invention relates to automatic transmissions and in particular to shift-by-wire transmissions.

BACKGROUND

A traditional automatic transmission includes a transmission control device employed to control the transmission of a motor vehicle. The transmission control device is used to select several ranges, such as Park, wherein the transmission is locked to prevent the vehicle from moving, Neutral, wherein the transmission allows the vehicle to be moved freely, such as when being towed, Reverse, wherein the transmission allows the vehicle to move backwards, and one or more Drive ranges that enable forward motion of the vehicle. Usually, the transmission control device is in the form of a lever connected with a mechanical connection, such as a cable or a hydraulic line, to the transmission. Typically, the lever is also connected to an indicator. As the transmission control mechanism is moved from one range to another, the mechanical connection physically shifts the transmission to the selected setting and the indicator moves to show the driver which range has been selected. Even if the vehicle is turned off, the driver is able to determine the current transmission range from the indicator and, in some cases, is able to move the transmission control mechanism to Neutral if, for example, the vehicle is to be towed.

The traditional automatic transmission utilizes multiple friction elements for automatic gear ratio shifting. Broadly speaking, these friction elements may be described as torque establishing elements although more commonly they are referred to as clutches or brakes. The friction elements function to establish power flow paths from an internal combustion engine to a set of vehicle traction wheels. During acceleration of the vehicle, the overall speed ratio, which is the ratio of a transmission input shaft speed to a transmission output shaft speed, is reduced during a ratio upshift as vehicle speed increases for a given engine throttle setting. A downshift to achieve a higher speed ratio occurs as an engine throttle setting increases for any given vehicle speed, or when the vehicle speed decreases as the engine throttle setting is decreased. Various planetary gear configurations are found in modern automatic transmissions. However, the basic principle of shift kinematics remains similar. Shifting an automatic transmission having multiple planetary gear sets is accompanied by applying and/or releasing friction elements to change speed and torque relationships by altering the torque path through the planetary gear sets. Friction elements are usually actuated either hydraulically or mechanically based on the position of the transmission control device.

In a shift-by-wire transmission arrangement, the mechanical connection between the transmission control device and the transmission is eliminated. Instead, the transmission control device takes the form of a gear shift module configured to transmit an electrical signal to an electronic controller. The controller directs separate actuators to apply or release the various friction elements to obtain a desired gear ratio. The gear shift module is not necessarily in the form of a lever because the control device is no longer moving a mechanical connection for controlling the transmission. Instead, the gear shift module is typically an electro-mechanical interface (e.g., a series of buttons, lever or knob) that is used to instruct the transmission to switch between the transmission ranges.

SUMMARY

A vehicle according to the present disclosure includes a shift-by-wire transmission, a pressure source configured to selectively provide hydraulic pressure in the absence of engine power, an internal combustion engine, and a controller. The shift-by-wire transmission includes a hydraulic actuator coupled to a shift element configured to selectively place the transmission in PARK. The pressure source is in fluid communication with the actuator. The controller is configured to, in response to a driver input and the engine being off, control the pressure source to provide hydraulic pressure to the hydraulic actuator.

In one embodiment, the driver input is a key-on event. In another embodiment, the driver input is a driver actuation of a brake pedal.

In one embodiment, the transmission includes at least one gear set. In such an embodiment, the shift element includes a parking pawl that is selectively engageable with the gear set. When engaged with the gear set, the parking pawl restrains vehicle motion.

In some embodiments, the pressure source includes an electric motor. In various other embodiments, the pressure source includes an accumulator.

A method for controlling a vehicle, where the vehicle includes an engine, a shift-by-wire transmission including a parking gear and an engine-driven pump, and an accumulator in fluid communication with the parking gear, includes controlling the transmission pump to provide hydraulic pressure to the transmission in response to the engine being on. The method additionally includes controlling the accumulator to provide hydraulic pressure to the parking gear in response to a driver input and the engine being off.

In one embodiment, the driver input is a key-on event. In another embodiment, the driver input is a driver actuation of a brake pedal. In some embodiments, the parking gear includes a park mechanism configured to selectively restrain the vehicle against motion while the vehicle is unattended. The parking gear additionally includes a hydraulic actuator in fluid communication with the accumulator and configured to selectively disengage the park mechanism. One embodiment additionally includes shifting the transmission into NEUTRAL in response to a second driver input and the transmission being in PARK.

A method for controlling a vehicle according to the present disclosure, where the vehicle includes a shift-by-wire transmission with a parking gear and an electric pump in fluid communication with the parking gear, includes controlling the pump to provide hydraulic pressure to the parking gear. The controlling of the electric pump is performed in response to the transmission being in PARK, a first driver input, and the engine being off. The method additionally includes shifting the transmission out of PARK in response to a second driver input.

In one embodiment, the first drive input is a driver actuation of a brake pedal. In another embodiment, the first driver input is a key-on event.

Embodiments according to the present disclosure provide a number of advantages. For example, the present disclosure provides a system and method for shifting a shift-by-wire transmission out of PARK while an engine in the vehicle is not running. In addition, systems according to the present disclosure provide means for a driver to do so from within the vehicle cabin, avoiding accessing a transmission override located under a vehicle hood. Furthermore, the present disclosure does so without adding the cost and complexity associated with a manual transmission override.

The above advantage and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A shift-by-wire or park-by-wire transmission refers to an arrangement having no mechanical connection between a transmission control device and the transmission. Instead, a gear shift module transmits an electrical signal to an electronic controller, which directs separate actuators to apply or release the various friction elements, such as clutches or brakes, to obtain a desired gear ratio. In some embodiments, the transmission may be provided with a parking pawl that is operated by one of the actuators. The parking pawl may engage with at least one gear in the transmission to inhibit vehicle motion or release from the at least one gear to permit vehicle motion. In some embodiments the parking pawl may be engaged in response to a driver shifting the transmission to PARK. In other embodiments, a parking pawl may be engaged in response to a driver activating a parking brake. Of course, various other parking elements may also be used to inhibit vehicle motion.

In some configurations, the actuators operating the friction elements and parking pawl are hydraulic actuators. Under normal vehicle operation, an engine drives a transmission pump to supply hydraulic pressure to the actuators and enable application or release of the friction elements or parking brake. Because there is not a mechanical connection between the gear shift module and the transmission, in the absence of hydraulic pressure to the actuators, a driver will be unable to shift the transmission between gears. When the engine is off, the gear shift module may not be usable to shift gears.

Under some circumstances, however, it may be desirable to shift the vehicle from PARK to another gear without the engine running. For example, if the engine is inoperable, it may be desirable to shift the transmission out of PARK to facilitate towing. As an additional example, it may be desirable to roll the vehicle to a new location without running the engine. Using the standard gear shift module, shifting out of PARK without operating the engine is not possible. Consequently, the transmissions are provided with a manual override mechanism. This may include a mechanism available under the vehicle hood or a cable mechanism available within the cabin. Such solutions may be difficult for a user to access, difficult to route through a vehicle, and also add complexity and cost to the vehicle.

Figure 1:
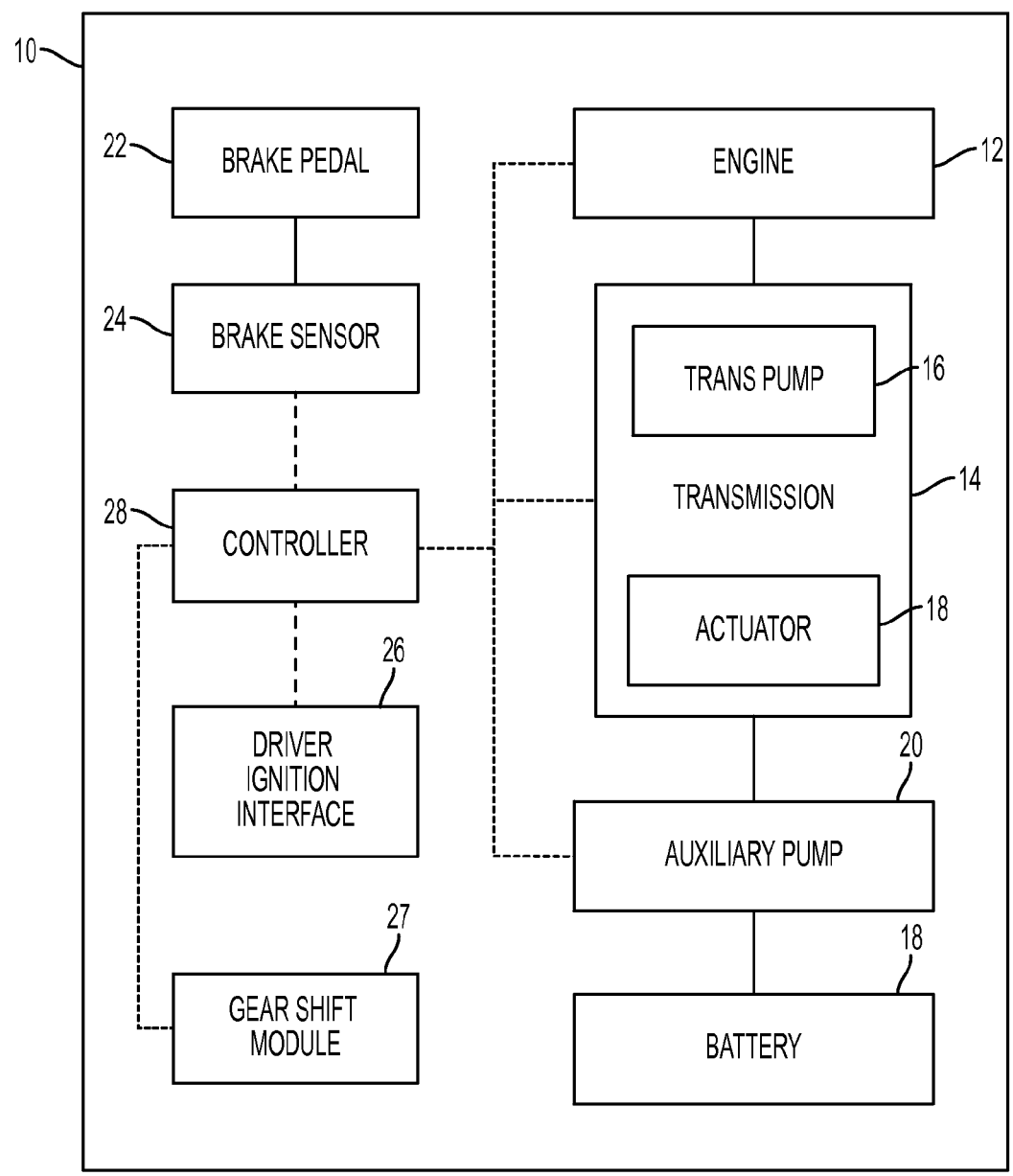
FIG. 1 is a schematic representation of a vehicle including a shift-by-wire transmission according to the present disclosure.

Referring now to FIG. 1, a vehicle 10 is illustrated in schematic form. The vehicle 10 includes an engine 12 and a shift-by-wire transmission 14. The transmission 14 includes an associated transmission pump 16 that is operably coupled to and driven by the engine 12. The transmission additionally includes at least one actuator 18. The actuator 18 is configured to selectively engage or release a vehicle parking mechanism. In some embodiments, the vehicle parking mechanism includes a pawl that engages with or releases from a gear in the transmission to restrain vehicle motion. Additional actuators (not shown) may control various other friction devices, such as clutches and brakes, to selectively transmit power from the engine 12 to vehicle wheels (not shown). The transmission pump 16 is in fluid communication with the actuator 18 and, when active, provides hydraulic pressure to the actuator 18 and other components.

The vehicle 10 additionally includes a battery 18 and an auxiliary pump 20. The auxiliary pump 20 is an electric pump that is in fluid communication with the transmission 14 and specifically with the actuator 18. The auxiliary pump 20 is configured to provide hydraulic pressure to the transmission 14 using electric power from the battery 18. Such pumps may be provided in, for example, stop-start vehicles that are configured to automatically stop a vehicle engine in response to a first set of predetermined operating conditions and automatically restart the vehicle engine in response to a second set of predetermined operating conditions. Stop-start vehicles may be equipped with such auxiliary pumps to maintain hydraulic pressure in the transmission while the engine has been automatically stopped. Other vehicles not equipped with stop-start functionality may also be provided with an electric auxiliary pump.

The vehicle 10 also includes a brake pedal 22 and an associated brake pedal sensor 24. The brake pedal sensor provides a signal in response to a driver actuation of the brake pedal. The vehicle 10 further includes a driver ignition interface 26. The driver ignition interface 26 may include, in various embodiments, a key interface, a button, or other appropriate interface. The driver ignition interface 26 provides a signal in response to a driver input. The vehicle 10 additionally includes a gear shift interface 27. The gear shift interface 27 provides user controls for receiving commands to shift between various gears. In various embodiments, the gear shift interface 27 may include a lever with PRND indicators, a rotary dial, or push buttons.

The engine 12, transmission 14, auxiliary pump 20, brake sensor 24, and driver ignition interface 26 are all in communication with or under the control of at least one controller 28. In various embodiments, the controller or controllers 28 may be a vehicle system controller or a plurality of controllers in communication with each other. The controller or controllers 28 may, of course, be in communication with various other sensors and vehicle components not illustrated in FIG. 1.

Figure 2:
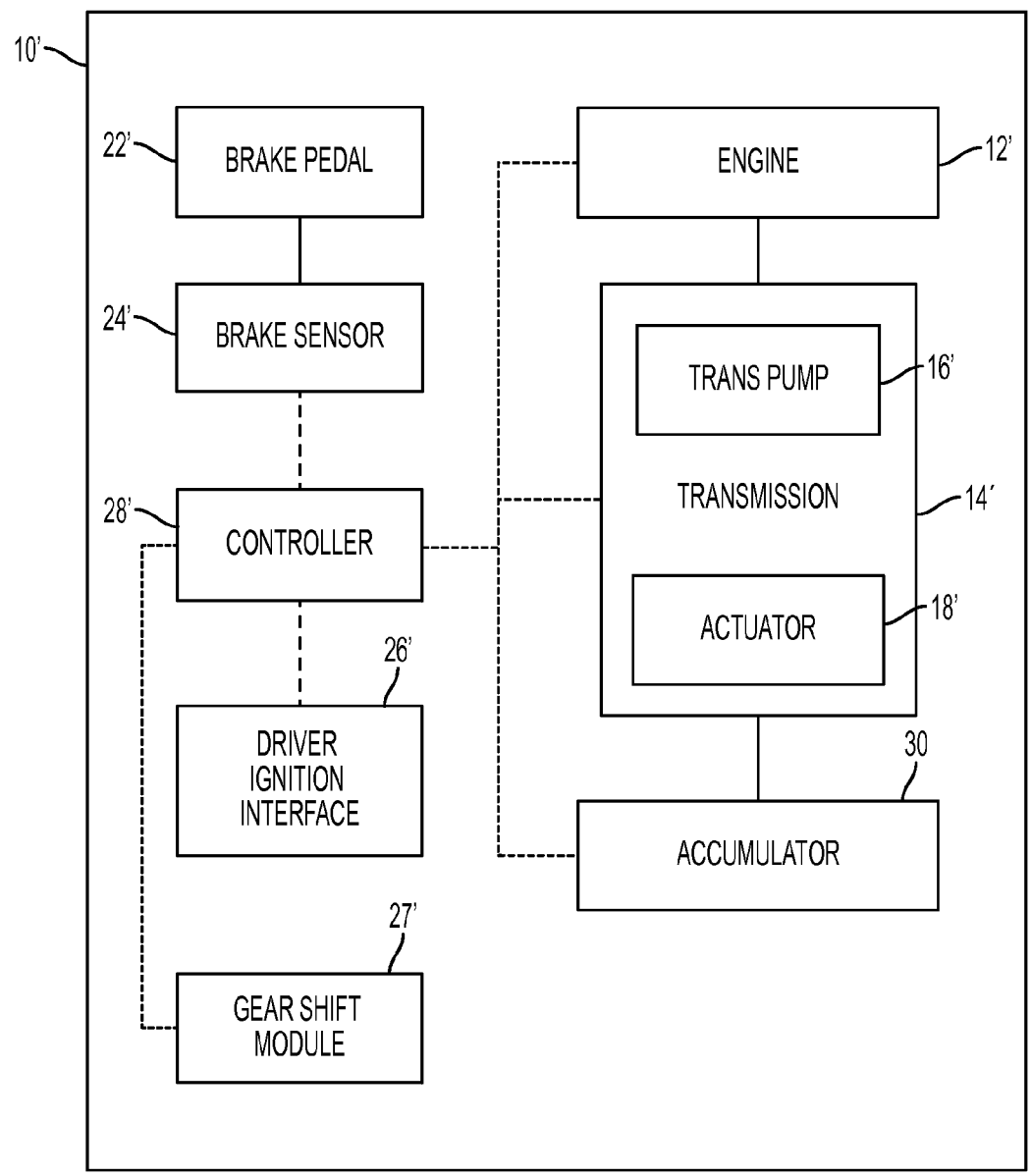
FIG. 2 is a schematic representation of another embodiment of a vehicle according to the present disclosure.

Referring now to FIG. 2, another embodiment of a vehicle according to the present disclosure is illustrated in schematic form. The vehicle 10' includes an engine 12' and a shift-by-wire transmission 14' having a transmission pump 16' and at least one actuator 18'. The vehicle 10' additionally includes a brake pedal 22' with an associated pedal sensor 24', a driver ignition interface 26', and a gear shift interface 27'. The vehicle additionally includes a hydraulic accumulator 30. The hydraulic accumulator 30 is in fluid communication with the transmission, in particular with the at least one actuator 18'.

The accumulator 30 may be a spring accumulator, a compressed gas accumulator, or any other appropriate mechanism for storing hydraulic fluid under pressure.

The engine 12', transmission 14', accumulator 30, brake sensor 24', driver ignition interface 26', and gear shift interface 27' are all in communication with or under the control of at least one controller 28'. In various embodiments, the controller or controllers 28' may be a vehicle system controller or a plurality of controllers in communication with each other. The controller or controllers 28' may, of course, be in communication with various other sensors and vehicle components not illustrated in FIG. 2.

In various other embodiments, other pressure sources may be used in place of an accumulator or electric motor. Generally speaking, any appropriate pressure source that is configured to operate in the absence of engine power may be similarly installed in fluid communication with the transmission and utilized in conjunction with the method described below with respect to FIG. 3.

Figure 3:
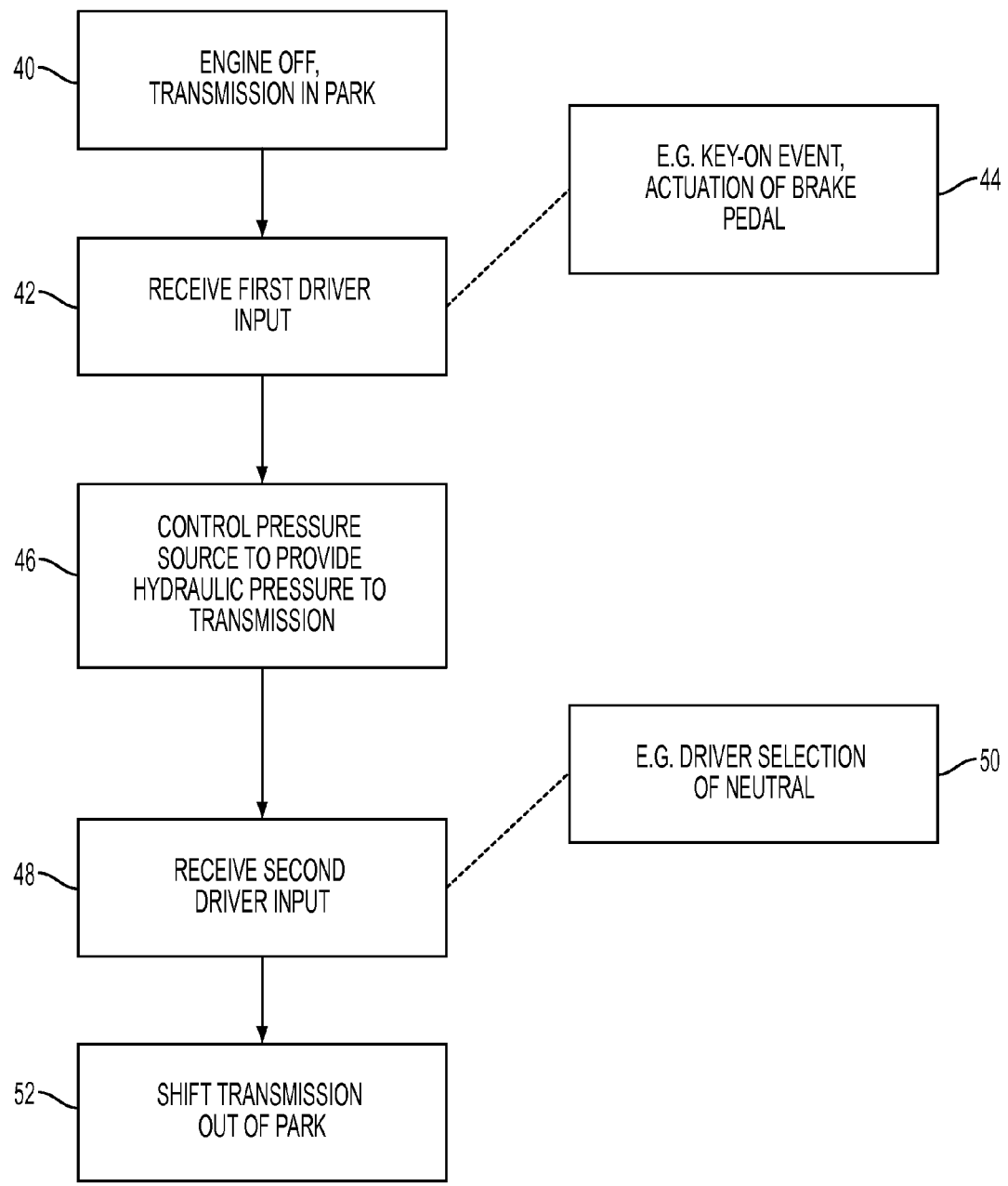
FIG. 3 illustrates a method of controlling a vehicle including a shift-by wire according to the present disclosure in flowchart form.

Referring now to FIG. 3, a method of controlling a vehicle according to the present disclosure is illustrated in flowchart form. The method begins with the engine off and the transmission in PARK, as illustrated at block 40. In some embodiments, this may include the engagement of a parking pawl with a gear in the transmission.

Subsequently, a first driver input is received, as illustrated at 42. In various embodiments, the first driver may include a key-on event or an actuation of the brake pedal, as illustrated at block 44. In other embodiments, other appropriate driver inputs may be used. Generally speaking, an appropriate first driver input will confirm the presence of a driver in the vehicle, thus avoiding an unintentional shifting of the transmission out of PARK when no occupant is present.

In response to the first driver input, a pressure source is controlled to provide hydraulic pressure to the transmission, as illustrated at block 46. In one embodiment, the pressure source is an electric motor, as is illustrated at numeral 20 in FIG. 1. In another embodiment, the pressure source is an accumulator, as is illustrated at numeral 30 in FIG. 2. In further embodiments, other appropriate pressure sources configured to selectively provide pressure in the absence of engine power may be used. Providing hydraulic pressure to the transmission includes providing hydraulic pressure to at least one actuator. The actuator is coupled with a parking pawl or other braking element.

A second driver input is received, as illustrated at block 48. The second driver input may be, for example, a driver selection of NEUTRAL on a gear shift module, as illustrated at block 50. In other embodiments, the second driver input may be another appropriate input indicative of a driver's intent to shift the car out of PARK, such as a driver release of a parking brake.

The transmission is then shifted out of PARK, as illustrated at block 52. In embodiments including a parking pawl selectively engaged with a gear in the transmission, shifting the transmission out of park includes controlling an associated actuator to disengage the parking pawl from the gear in the transmission.

As can be seen from the various embodiments, the present invention provides a system and method for shifting a shift-by-wire transmission out of PARK when an engine in the vehicle is off. Furthermore, the present invention provides such a system and method without the increased cost, complexity, and difficulty of access associated with a manual transmission override system.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A vehicle comprising:
   an internal combustion engine;
   a shift-by-wire transmission including a hydraulic actuator coupled to a shift element configured to selectively place the transmission in PARK;
   a pressure source in fluid communication with the hydraulic actuator and configured to selectively provide pressure in the absence of engine power; and
   a controller configured to, in response a first driver input with the engine off, control the pressure source to provide hydraulic pressure to the hydraulic actuator and to, in response to a second driver input with the engine off, shift the transmission out of PARK without starting the engine.

2. The vehicle of claim 1, wherein the first driver input is a key-on event.

3. The vehicle of claim 1, wherein the first driver input is a driver actuation of a brake pedal.

4. The vehicle of claim 1, wherein the transmission includes a gear set and the shift element includes a parking pawl that is selectively engageable with the gear set to restrain vehicle motion.

5. The vehicle of claim 1, wherein the pressure source includes an electric motor.

6. The vehicle of claim 1, wherein the pressure source includes an accumulator.

7. A method for controlling a vehicle including an engine, a shift-by-wire transmission having a parking gear and having an engine-driven pump, and an accumulator in fluid communication with the parking gear, the method comprising:
   in response to the engine being on, controlling a transmission pump to provide hydraulic pressure to the transmission;
   in response to a driver input and the engine being off, controlling the accumulator to provide hydraulic pressure to the parking gear; and
   in response to a second driver input and the transmission being in PARK, shifting the transmission into NEUTRAL.

8. The method of claim 7, wherein the driver input is a key-on event.

9. The method of claim 7, wherein the driver input is a driver actuation of a brake pedal.

10. The method of claim 7, wherein the parking gear includes a park mechanism configured to selectively restrain the vehicle against motion while the vehicle is unattended and a hydraulic actuator in fluid communication with the accumulator and configured to selectively disengage the park mechanism.

11. A method for controlling a vehicle including a shift-by-wire transmission with a parking gear and an electric pump in fluid communication with the parking gear, comprising:
- in response to a first driver input with the transmission in PARK and the engine being off, controlling the pump to provide hydraulic pressure to the parking gear; and
- without starting the engine, shifting the transmission out of PARK in response to a second driver input.

12. The method of claim 11, wherein the first driver input is a driver actuation of a brake pedal.

13. The method of claim 11, wherein the first driver input is a key-on event.

* * * * *